UNITED STATES PATENT OFFICE.

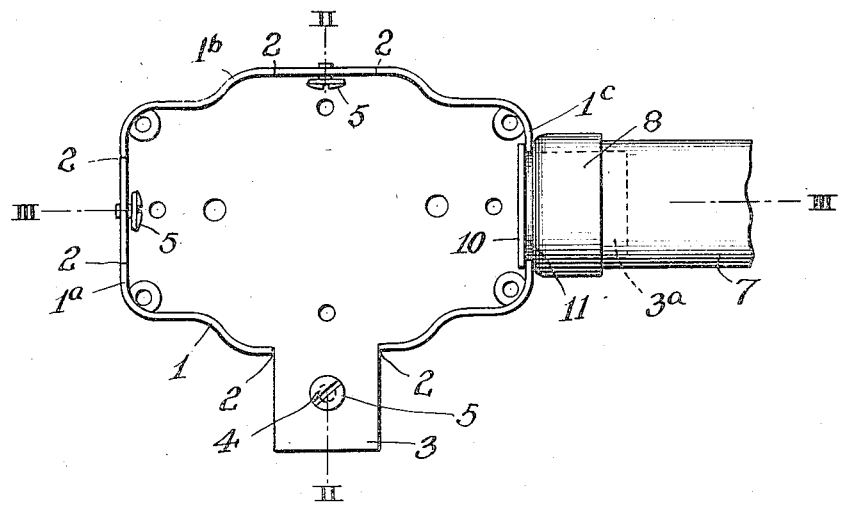

HENRY R. GILSON, OF BEAVER, PENNSYLVANIA, ASSIGNOR TO NATIONAL METAL MOLDING COMPANY, OF PITTSBURGH, PENNSYLVANIA, A CORPORATION OF PENNSYLVANIA.

JUNCTION-BOX.

1,032,058.  Specification of Letters Patent.  Patented July 9, 1912.

Application filed October 2, 1911. Serial No. 652,320.

*To all whom it may concern:*

Be it known that I, HENRY R. GILSON, residing at Beaver, in the county of Beaver and State of Pennsylvania, a citizen of the United States, have invented or discovered certain new and useful Improvements in Junction-Boxes, of which improvements the following is a specification.

My invention relates to metal junction-boxes, used with metal-molding electrical conduits; and the object of my invention is to provide a box so constructed that its installation will be much simplified and cheapened.

My invention is illustrated in the accompanying drawing, which forms part of my specification, and in which—

Figure 1 is a plan view of a junction-box with a metal-molding conduit secured to it, and in this figure the cover is removed from the box; Fig. 2 is a sectional view taken on the line II—II, Fig. 1, showing the box cover in position; Fig. 3 is a sectional view taken on the line III—III, Fig. 1; and Fig. 4 is a perspective view of a clamping member.

In the several figures, like numerals are used to designate like parts.

Junction-boxes of the character shown herein usually consist of two parts, a body or box-portion and a cover. The side-walls of such boxes, as heretofore constructed, have usually been provided with what are known as "knock-out" or "twist-out" portions, formed in the manufacture of the box by buckling or partially cutting around certain areas, which, when finally knocked or twisted out, leave inlet orifices in the walls of the box for the connection of conduits. When such knock-out or twist-out portions have been removed, so as to form an orifice for a conduit connection, it has been found necessary to employ a specially provided connecting strip, having one end secured to the junction-box and the other end to the conduit by screws or other suitable securing members. The use of such a strip involves an appreciable expense, both for the manufacturer of the strips and in the time utilized in their installation.

My invention consists in providing a junction-box, wherein the use of a strip to connect a metal molding conduit to the box is unnecessary. To such an end I provide each wall, through which it may be desirable to pass an electrical conductor, with cuts or partial fractures, such that a portion of the wall may be bent downwardly and outwardly without being severed from the box structure, and in its bent-out position may be used for connecting a conduit member instead of using strips, as has been the practice heretofore.

Referring to the drawing, I have shown a junction-box having four walls 1, 1$^a$, 1$^b$, and 1$^c$. The walls 1$^a$ and 1$^b$ are continuous, except for the cuts 2, 2, in each wall, which cuts preferably extend as shown in Fig. 3 from the bottom or floor of the box to within a short distance from the outer edge of the wall. In the wall 1, the portion of its extent lying between the cuts 2, 2, is shown bent downwardly in such a position as to form a lug 3. Such a lug, it will be readily understood, may be used to connect a conduit member to the junction box, in place of using a separate and detached strip. The screw-holes 4, or other suitable means of connection may be properly provided during the manufacture of the box. In the wall 1$^c$ a lug 3$^a$ is shown bent downwardly and a conduit member secured to it as by the screw 5. The conduit preferably consists of two members 6 and 7, each having a generally elliptical cross-section, and adapted to clamp one over the other.

To the end that a suitable finish may be had for the conduit connection I provide closure piece 8, shown particularly in Fig. 4. Such closure piece is preferably formed so as to have an elliptically shaped portion 9, adapted to clamp over the outer conduit member; a lug 10 adapted to extend under the cover; and rounded portions 11 adapted to engage the side walls of the box and to guard against the abrasion or cutting of the insulation on an electrical conductor.

In the practice of my invention a wireman, installing a junction-box, may bend down whatever lugs desired, the lugs usually being bent down to extend in the same general plane as the bottom portion of the box; and in case a mistake be made so that the wrong lug is bent out, the said lug may be bent back to form again a part of the side wall and the box will not be rendered useless as in the case of twist-out or bent-out portions.

I do not wish to limit myself to the form of box shown herein for obviously my invention is applicable to boxes of different forms and to boxes used with different kinds of conduits.

I claim herein as my invention:

1. A junction-box for electrical conduits, consisting of a bottom portion or floor and side walls, the side walls of said box provided with cuts setting apart limited areas which, when bent down, remain integral with the bottom portion of the box and form connecting lugs.

2. A junction-box for metal molding construction, consisting of a bottom portion, and a side-wall, the continuity of said side-wall interrupted by two cuts extending from the outside edge of the said side-wall to the intersection of the side-wall with the bottom portion.

3. The combination with a junction box provided with a bent-out portion, and a conduit member secured to said bent-out portion, of a closure-piece provided with a clamping portion, a lug, and an inwardly grooved portion between said lug and clamping portion.

In testimony whereof I have hereunto set my hand.

HENRY R. GILSON.

Witnesses:
PAUL N. CRITCHLOW,
BEATRICE FITZGERALD.